(12) United States Patent
Verge et al.

(10) Patent No.: US 9,766,738 B1
(45) Date of Patent: Sep. 19, 2017

(54) POSITION AND USAGE BASED PRIORITIZATION FOR CAPACITANCE SENSE INTERFACE

(75) Inventors: Gregory J. Verge, Lynnwood, WA (US); Andrew C. Page, Kirkland, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 2226 days.

(21) Appl. No.: 11/509,513

(22) Filed: Aug. 23, 2006

(51) Int. Cl.
*G06F 3/041* (2006.01)
*G06F 3/044* (2006.01)
*G06F 3/0488* (2013.01)

(52) U.S. Cl.
CPC ............ *G06F 3/0416* (2013.01); *G06F 3/044* (2013.01); *G06F 3/04886* (2013.01)

(58) Field of Classification Search
CPC ........ G06F 3/011; G06F 3/041; G06F 3/0416; G06F 3/0418; G06F 3/044; G06F 3/04886; G06F 2203/04101; G06F 2203/04108
See application file for complete search history.

(56) References Cited

U.S. PATENT DOCUMENTS

| | | | |
|---|---|---|---|
| 3,696,908 A | 10/1972 | Gluck et al. | |
| 3,974,332 A | 8/1976 | Abe et al. | |
| 4,283,713 A | 8/1981 | Philipp | |
| 4,305,135 A * | 12/1981 | Dahl et al. | ............... 341/33 |
| 4,438,404 A | 3/1984 | Philipp | |
| 4,475,151 A | 10/1984 | Philipp | |
| 4,497,575 A | 2/1985 | Philipp | |
| 4,543,564 A | 9/1985 | Audoin et al. | |
| 4,736,097 A | 4/1988 | Philipp | |
| 4,773,024 A | 9/1988 | Faggin et al. | |
| 4,802,103 A | 1/1989 | Faggin et al. | |
| 4,876,534 A | 10/1989 | Mead et al. | |
| 4,879,461 A | 11/1989 | Philipp | |
| 4,935,702 A | 6/1990 | Mead et al. | |
| 4,953,928 A | 9/1990 | Anderson et al. | |
| 4,954,823 A | 9/1990 | Binstead | |
| 4,962,342 A | 10/1990 | Mead et al. | |
| 5,049,758 A | 9/1991 | Mead et al. | |
| 5,055,827 A | 10/1991 | Philipp | |
| 5,059,920 A | 10/1991 | Anderson et al. | |
| 5,068,622 A | 11/1991 | Mead et al. | |
| 5,073,759 A | 12/1991 | Mead et al. | |

(Continued)

OTHER PUBLICATIONS

Cypress Semiconductor Corporation, "Cypress Introduces PSoC(TM)-Based Capacitive Touch Sensor Solution", Cypress Press Release, May 31, 2005, http://www.cypress.com/portal/server.pt?space=CommunityPage&control=SetCommunity&CommunityID=208&PageID=218&DirectoryID=661552 (Retrieved on Feb. 5, 2007).

(Continued)

*Primary Examiner* — Keith Crawley

(57) ABSTRACT

A technique for improving capacitive sensing accuracy. Concurrent activations of multiple capacitance sensors within an array of capacitance sensors are sensed. One of the concurrent activations of the multiple capacitance sensors is accepted as a user activation. Remaining ones of the concurrent activations of the multiple capacitance sensors are rejected based on their physical location within the array of capacitance sensors relative to the one of the concurrent activations of the multiple capacitance sensors accepted as the user activation.

20 Claims, 11 Drawing Sheets

ASSIGNING DIFFERENT SENSITIVITIES

| USER INTERFACE SENSOR | SENSITIVITY TO CAPACITANCE CHANGE ΔC |
|---|---|
| ARROW/POINTER FUNCTION ( ↑ ← ↓ → ) | HIGHEST |
| CORNER INTERFACE SENSOR (E.G., A, B, CALL, CANCEL) | INTERMEDIATE |
| SELECT/ENTER FUNCTION | LOWEST |

(56) References Cited

U.S. PATENT DOCUMENTS

| | | | |
|---|---|---|---|
| 5,083,044 A | 1/1992 | Mead et al. | |
| 5,095,284 A | 3/1992 | Mead | |
| 5,097,305 A | 3/1992 | Mead et al. | |
| 5,107,149 A | 4/1992 | Platt et al. | |
| 5,109,261 A | 4/1992 | Mead et al. | |
| 5,119,038 A | 6/1992 | Anderson et al. | |
| 5,120,996 A | 6/1992 | Mead et al. | |
| 5,122,800 A | 6/1992 | Philipp | |
| 5,126,685 A | 6/1992 | Platt et al. | |
| 5,146,106 A | 9/1992 | Anderson et al. | |
| 5,160,899 A | 11/1992 | Anderson et al. | |
| 5,165,054 A | 11/1992 | Platt et al. | |
| 5,166,562 A | 11/1992 | Allen et al. | |
| 5,204,549 A | 4/1993 | Platt et al. | |
| 5,243,554 A | 9/1993 | Allen et al. | |
| 5,248,873 A | 9/1993 | Allen et al. | |
| 5,260,592 A | 11/1993 | Mead et al. | |
| 5,270,963 A | 12/1993 | Allen et al. | |
| 5,276,407 A | 1/1994 | Mead et al. | |
| 5,289,023 A | 2/1994 | Mead | |
| 5,303,329 A | 4/1994 | Mead et al. | |
| 5,305,017 A | 4/1994 | Gerphide | |
| 5,324,958 A | 6/1994 | Mead et al. | |
| 5,331,215 A | 7/1994 | Allen et al. | |
| 5,336,936 A | 8/1994 | Allen et al. | |
| 5,339,213 A | 8/1994 | O'Callaghan | |
| 5,349,303 A | 9/1994 | Gerpheide | |
| 5,374,787 A | 12/1994 | Miller et al. | |
| 5,381,515 A | 1/1995 | Platt et al. | |
| 5,384,467 A | 1/1995 | Plimon et al. | |
| 5,408,194 A | 4/1995 | Steinbach et al. | |
| 5,488,204 A | 1/1996 | Mead et al. | |
| 5,495,077 A | 2/1996 | Miller et al. | |
| 5,541,878 A | 7/1996 | LeMoncheck et al. | |
| 5,543,588 A | 8/1996 | Bisset et al. | |
| 5,543,590 A | 8/1996 | Gillespie et al. | |
| 5,543,591 A | 8/1996 | Gillespie et al. | |
| 5,555,907 A | 9/1996 | Philipp | |
| 5,565,658 A | 10/1996 | Gerpheide et al. | |
| 5,566,702 A | 10/1996 | Philipp | |
| 5,629,891 A | 5/1997 | LeMoncheck et al. | |
| 5,648,642 A | 7/1997 | Miller et al. | |
| 5,682,032 A | 10/1997 | Philipp | |
| 5,730,165 A | 3/1998 | Philipp | |
| 5,734,928 A * | 3/1998 | Nakasuji | G06F 3/023 708/146 |
| 5,757,368 A | 5/1998 | Gerpheide et al. | |
| 5,763,909 A | 6/1998 | Mead et al. | |
| 5,767,457 A | 6/1998 | Gerpheide et al. | |
| 5,796,183 A | 8/1998 | Hourmand | |
| 5,812,698 A | 9/1998 | Platt et al. | |
| 5,841,078 A | 11/1998 | Miller et al. | |
| 5,844,265 A | 12/1998 | Mead et al. | |
| 5,854,625 A | 12/1998 | Frisch et al. | |
| 5,861,583 A | 1/1999 | Schediwy et al. | |
| 5,861,875 A | 1/1999 | Gerpheide | |
| 5,864,242 A | 1/1999 | Allen et al. | |
| 5,864,392 A | 1/1999 | Winklhofer et al. | |
| 5,880,411 A | 3/1999 | Gillespie et al. | |
| 5,889,236 A | 3/1999 | Gillespie et al. | |
| 5,914,465 A | 6/1999 | Allen et al. | |
| 5,914,708 A | 6/1999 | LaGrange et al. | |
| 5,920,310 A | 7/1999 | Faggin et al. | |
| 5,926,566 A | 7/1999 | Wang et al. | |
| 5,942,733 A | 8/1999 | Allen et al. | |
| 5,943,052 A | 8/1999 | Allen et al. | |
| 5,969,513 A | 10/1999 | Clark | |
| 6,023,422 A | 2/2000 | Allen et al. | |
| 6,028,271 A | 2/2000 | Gillespie et al. | |
| 6,028,959 A | 2/2000 | Wang et al. | |
| 6,097,432 A | 8/2000 | Mead et al. | |
| 6,148,104 A | 11/2000 | Wang et al. | |
| 6,185,450 B1 | 2/2001 | Seguine et al. | |
| 6,188,228 B1 | 2/2001 | Philipp | |
| 6,188,391 B1 | 2/2001 | Seely et al. | |
| 6,222,528 B1 | 4/2001 | Gerpheide et al. | |
| 6,239,389 B1 | 5/2001 | Allen et al. | |
| 6,249,447 B1 | 6/2001 | Boylan et al. | |
| 6,262,717 B1 | 7/2001 | Donohue et al. | |
| 6,280,391 B1 | 8/2001 | Olson et al. | |
| 6,288,707 B1 | 9/2001 | Philipp | |
| 6,304,014 B1 | 10/2001 | England et al. | |
| 6,320,184 B1 | 11/2001 | Winklhofer et al. | |
| 6,323,846 B1 | 11/2001 | Westerman et al. | |
| 6,326,859 B1 | 12/2001 | Goldman et al. | |
| 6,377,009 B1 | 4/2002 | Philipp | |
| 6,380,929 B1 | 4/2002 | Platt | |
| 6,380,931 B1 | 4/2002 | Gillespie et al. | |
| 6,414,671 B1 | 7/2002 | Gillespie et al. | |
| 6,430,305 B1 | 8/2002 | Decker | |
| 6,441,073 B1 | 8/2002 | Tanaka et al. | |
| 6,452,514 B1 | 9/2002 | Philipp | |
| 6,457,355 B1 | 10/2002 | Philipp | |
| 6,459,424 B1 * | 10/2002 | Resman | 345/173 |
| 6,466,036 B1 | 10/2002 | Philipp | |
| 6,473,069 B1 | 10/2002 | Gerpheide | |
| 6,489,899 B1 | 12/2002 | Ely et al. | |
| 6,498,720 B2 | 12/2002 | Glad | |
| 6,499,359 B1 | 12/2002 | Washeleski et al. | |
| 6,522,128 B1 | 2/2003 | Ely et al. | |
| 6,523,416 B2 | 2/2003 | Takagi et al. | |
| 6,534,970 B1 | 3/2003 | Ely et al. | |
| 6,535,200 B2 | 3/2003 | Philipp | |
| 6,570,557 B1 | 5/2003 | Westerman et al. | |
| 6,587,093 B1 | 7/2003 | Shaw et al. | |
| 6,610,936 B2 | 8/2003 | Gillespie et al. | |
| 6,624,640 B2 | 9/2003 | Lund et al. | |
| 6,639,586 B2 | 10/2003 | Gerpheide | |
| 6,642,857 B1 | 11/2003 | Schediwy et al. | |
| 6,649,924 B1 | 11/2003 | Philipp et al. | |
| 6,667,740 B2 | 12/2003 | Ely et al. | |
| 6,673,308 B2 | 1/2004 | Hino et al. | |
| 6,677,932 B1 | 1/2004 | Westerman | |
| 6,680,731 B2 | 1/2004 | Gerpheide et al. | |
| 6,683,462 B2 | 1/2004 | Shimizu | |
| 6,696,985 B2 * | 2/2004 | Houston | 341/21 |
| 6,705,511 B1 | 3/2004 | Dames et al. | |
| 6,714,817 B2 | 3/2004 | Daynes et al. | |
| 6,730,863 B1 | 5/2004 | Gerpheide et al. | |
| 6,747,635 B2 * | 6/2004 | Ossia | 345/169 |
| 6,750,852 B2 | 6/2004 | Gillespie et al. | |
| 6,788,221 B1 | 9/2004 | Ely et al. | |
| 6,798,218 B2 | 9/2004 | Kasperkovitz | |
| 6,809,275 B1 | 10/2004 | Cheng et al. | |
| 6,856,433 B2 | 2/2005 | Hatano et al. | |
| 6,873,203 B1 | 3/2005 | Latham, II et al. | |
| 6,888,538 B2 | 5/2005 | Ely et al. | |
| 6,893,724 B2 | 5/2005 | Lin et al. | |
| 6,969,978 B2 | 11/2005 | Dening | |
| 6,975,123 B1 | 12/2005 | Malang et al. | |
| 6,993,607 B2 | 1/2006 | Philipp | |
| 7,119,550 B2 | 10/2006 | Kitano et al. | |
| 7,256,714 B2 | 8/2007 | Philipp | |
| 7,279,904 B2 * | 10/2007 | Sato | 324/457 |
| 7,614,008 B2 | 11/2009 | Ording et al. | |
| 2002/0063688 A1 | 5/2002 | Shaw et al. | |
| 2002/0191029 A1 | 12/2002 | Gillespie et al. | |
| 2003/0025679 A1 | 2/2003 | Taylor et al. | |
| 2003/0062889 A1 | 4/2003 | Ely et al. | |
| 2003/0063428 A1 | 4/2003 | Nishi | |
| 2003/0080755 A1 | 5/2003 | Kobayashi | |
| 2003/0156098 A1 | 8/2003 | Shaw et al. | |
| 2003/0160808 A1 | 8/2003 | Foote et al. | |
| 2003/0183864 A1 | 10/2003 | Miyazawa | |
| 2003/0183884 A1 | 10/2003 | Miyazawa | |
| 2003/0184315 A1 | 10/2003 | Eberlein | |
| 2004/0140913 A1 * | 7/2004 | Engelmann et al. | 341/22 |
| 2004/0169594 A1 | 9/2004 | Ely et al. | |
| 2004/0178997 A1 | 9/2004 | Gillespie et al. | |
| 2004/0252109 A1 | 12/2004 | Trent, Jr. et al. | |
| 2004/0263864 A1 | 12/2004 | Lukacs et al. | |
| 2005/0021269 A1 | 1/2005 | Ely et al. | |
| 2005/0024341 A1 | 2/2005 | Gillespie et al. | |
| 2005/0030048 A1 * | 2/2005 | Bolender et al. | 324/661 |

(56) References Cited

U.S. PATENT DOCUMENTS

| | | | |
|---|---|---|---|
| 2005/0073302 A1 | 4/2005 | Hibbs et al. | |
| 2005/0073322 A1 | 4/2005 | Hibbs et al. | |
| 2005/0083110 A1 | 4/2005 | Latham, II et al. | |
| 2006/0032680 A1 | 2/2006 | Elias et al. | |
| 2006/0066582 A1* | 3/2006 | Lyon et al. | 345/173 |
| 2006/0097991 A1 | 5/2006 | Hotelling et al. | |
| 2006/0113974 A1 | 6/2006 | Kan et al. | |
| 2006/0164142 A1 | 7/2006 | Stanley | |
| 2006/0192690 A1* | 8/2006 | Philipp | 341/33 |
| 2006/0273804 A1 | 12/2006 | Delorme et al. | |
| 2007/0273561 A1* | 11/2007 | Philipp | 341/33 |
| 2008/0007434 A1 | 1/2008 | Hristov | |
| 2008/0094356 A1 | 4/2008 | Ording et al. | |

OTHER PUBLICATIONS

Seguine, Ryan, "Layout Guidelines for PSoC™ CapSense™," Cypress Semiconductor Corporation, Application Note AN2292, pp. 1-10, Jul. 22, 2005.

Lee, Mark, "EMC Design considerations for PsoC™ CapSense™ Applications," Cypress Semiconductor Corporation, Application Note AN2318, pp. 1-6, Sep. 16, 2005.

Cypress Semiconductor Corporation, "Release Notes srn017," pp. 1-3, Jan. 24, 2007.

Cypress Semiconductor Corporation, "PSoC® CY8C20x34 Technical Reference Manual (TRM)," PSoC CY8C20x34 TRM, Version 1.0, pp. 1-218, 2006.

Sedra, Adel S. et al., "Microelectronic Circuits," $3^{rd}$ Edition, Oxford University Press, pp. xiii-xx and 861-883, 1991.

Van Ess, David, "Simulating a 555 Timer with PSoC™," Cypress Semiconductor Corporation, Application Note AN2286, pp. 1-10, May 19, 2005.

Cypress Semiconductor Corporation, "FAN Controller CG6457AM and CG6462AM," PSoC™Mixed-Signal Array Preliminary Data Sheet, pp. 1-25, May 24, 2005.

Cypress Semiconductor Corporation, "PsoC Mixed-Signal Controllers," Product Description, pp. 1-2, http://www.cypress.com/portal/server.pt?space=CommunityPage&control=SetCommunity&CommunityID=209&PageID=215&gid=13&fid=24&category=false. (Sep. 27, 2005).

Cypress Semiconductor Corporation, "CY8C21x34 Data Sheet," CSR User Module, CSR V.1.0, Oct. 6, 2005, pp. 1-36.

Chapweske, Adam, "The PS/2 Mouse Interface," PS/2 Mouse Interfacing, 2001.

* cited by examiner

ASSIGNING DIFFERENT SENSITIVITIES

| USER INTERFACE SENSOR | SENSITIVITY TO CAPACITANCE CHANGE $\Delta C$ |
|---|---|
| ARROW/POINTER FUNCTION ( ↑ ← ↓ → ) | HIGHEST |
| CORNER INTERFACE SENSOR (E.G., A, B, CALL, CANCEL) | INTERMEDIATE |
| SELECT/ENTER FUNCTION | LOWEST |

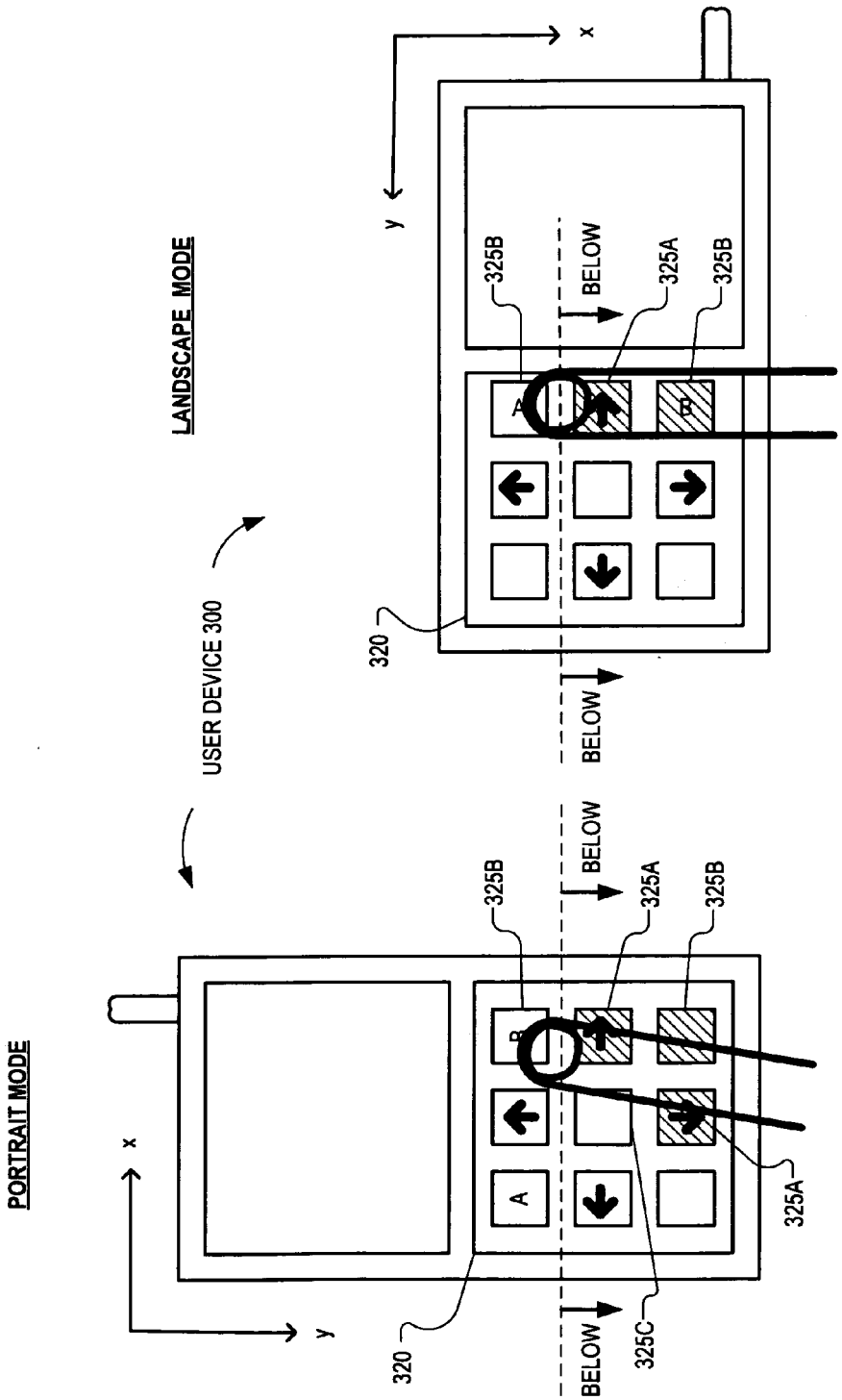

POSITION AND USAGE BASED PRIORITIZATION FOR CAPACITANCE SENSE INTERFACE

TECHNICAL FIELD

This disclosure relates generally to user interface devices and in particular, but not exclusively, relates to capacitive sense user interface devices.

BACKGROUND INFORMATION

Computing devices, such as notebook computers, personal data assistants ("PDAs"), and mobile handsets have user interface devices, which are also known as human interface devices ("HID"). One type of user interface device that has become more common is a capacitive sense interface. This technology is often referred to as capacitive touch-sense technology; however, this term is a misguided term since the user need not actually physically touch the interface to operate the technology. Rather, the user need only bring a conductive object, e.g., a finger, in close proximity to the capacitive sense interface.

Capacitive sense interfaces may assume a variety of shapes and sizes. FIG. 1A illustrates a conventional circular slider interface 105 having a center mechanical button 110. The illustrated circular slider interface 105 includes eight radial capacitance sensors 115 encircling mechanical button 110 and a processing device 120. Processing device 120 monitors capacitive changes in each of capacitance sensors 115 to register user interactions with circular slider interface 105. Circular sliders may be used to convey absolute positional information of a conductive object, such as to emulate a mouse in controlling cursor position on a display, or to emulate a scrolling function of the mouse. Circular sliders may also be used to actuate one or more functions associated with sensing elements of a sensing device.

FIG. 1B illustrates a conventional linear slider interface 130. Linear slider interface 130 includes a surface area on which a conductive object may be used to position a cursor in the x-axis (or alternatively in the y-axis). Linear slider interface 130 may include a one-dimensional array of capacitance sensors 135. When a conductive object makes contact or comes in proximity with a particular portion of linear slider interface 130, the individual capacitance sensors 135 will sense capacitive variations that are translated into an absolute or relative user interaction position. The capacitance variation may be sent as a signal to a coupled processing device (not illustrated) for analysis. For example, by detecting the capacitance variation of each sensor element, the position of the changing capacitance can be pinpointed. In other words, it can be determined which sensor element has detected the presence of the conductive object, and the motion and/or the position of the conductive object over multiple sensor elements can also be determined.

FIG. 1C illustrates a conventional touch pad interface 140. Touch pad interface 140 is often used in notebook computers to emulate the function of a personal computer ("PC") mouse. A touch pad interface is typically embedded into a PC notebook for built-in portability. Touch pad interface 140 can replicate mouse x/y movement by using two defined axes which contain a collection of sensor elements that detect the position of a conductive object, e.g., a finger. Mouse right/left button clicks can be replicated by two mechanical buttons, located in the vicinity of touch pad interface 140, or by tapping commands on touch pad interface 140 itself. Touch pad interface 140 provides a user interface device for performing such functions as positioning a cursor or selecting an item on a display. Touch pad interface 140 may include multi-dimensional sensor arrays for detecting movement in multiple axes. For example, touch pad interface 140 may be implemented as a two-dimensional array of linear sliders.

Accidental or unintentional user interaction is a concern when using capacitive touch-sense technology because a user need only bring his/her finger proximate to a capacitive touch-sense interface. When a user places his/her finger proximate to a capacitive sense interface, more than one capacitance sensor may sense a capacitive change. Traditional technology attempts to overcome this drawback by treating a capacitance sensor that first senses the capacitive change or that senses a greatest capacitance change as the capacitance sensor that the user likely intended to activate. However, if the user is not careful with which capacitance sensor he/she activates first or is careless with the exact placement of his/her finger, then an activated capacitance sensor may not coincide with the capacitance sensor that he/she intended to activate. These drawbacks can lead to an unpleasurable and unproductive user experience with conventional capacitive touch-sense technology.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 7A is a diagram illustrating a user device configured to operate in a portrait mode when the user device is operated in a portrait orientation, in accordance with an embodiment of the invention.

FIG. 7B is a diagram illustrating a user device configured to operate in a landscape mode when the user device is operated in a landscape orientation, in accordance with an embodiment of the invention.

DETAILED DESCRIPTION

Embodiments of a method, apparatus, and system for implementing a capacitive sense user interface are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
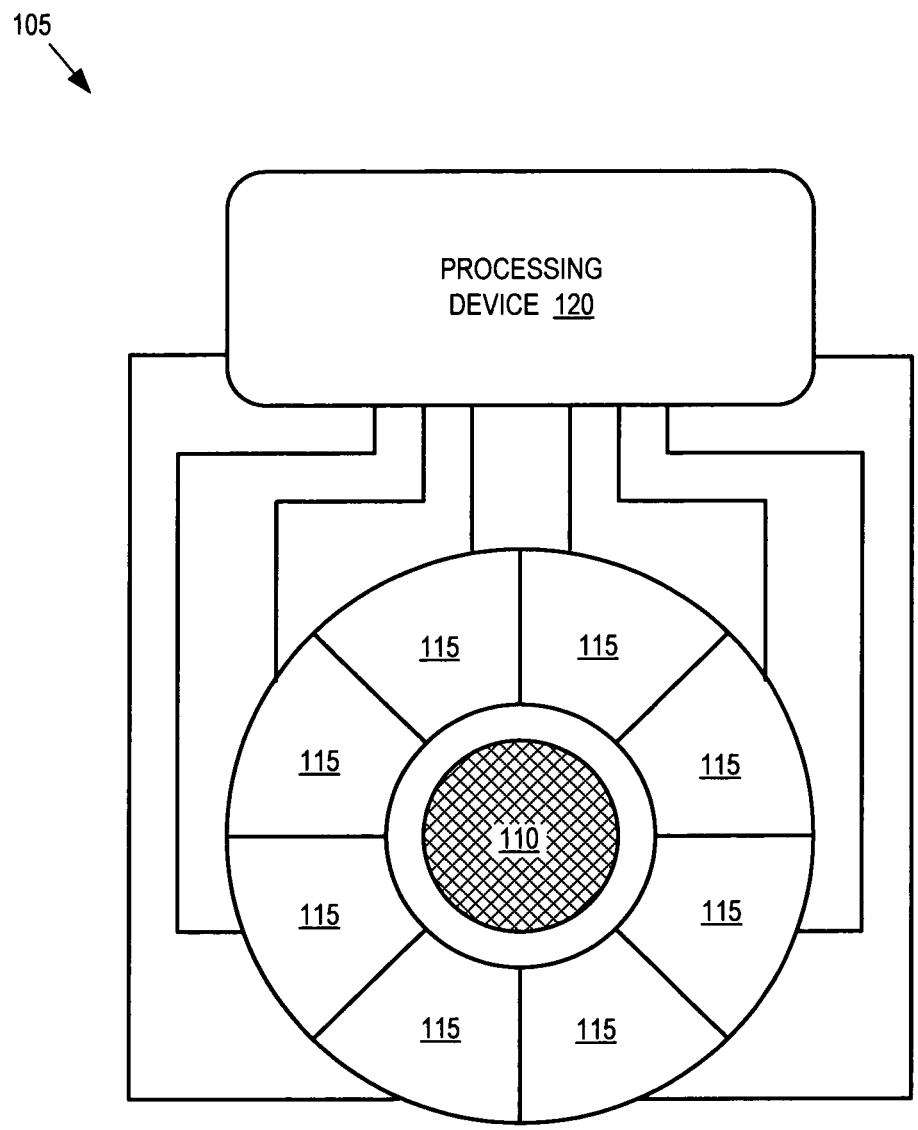
FIG. 1A illustrates a conventional circular slider interface having a center mechanical button.
Figure 1B:
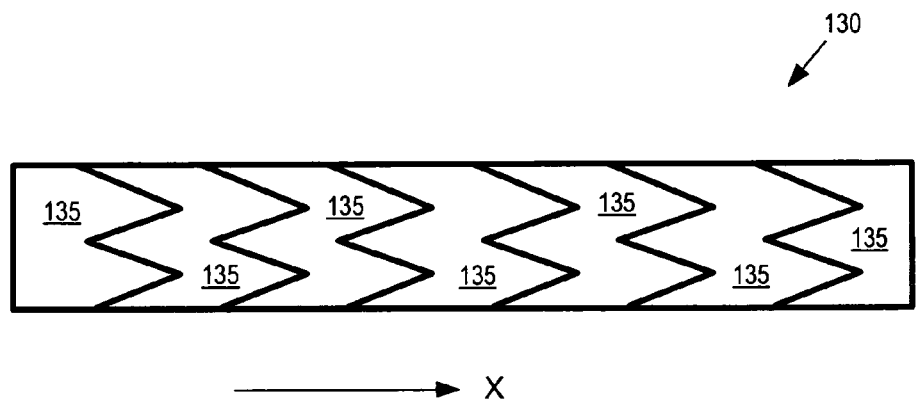
FIG. 1B illustrates a conventional linear slider interface.
Figure 1C:
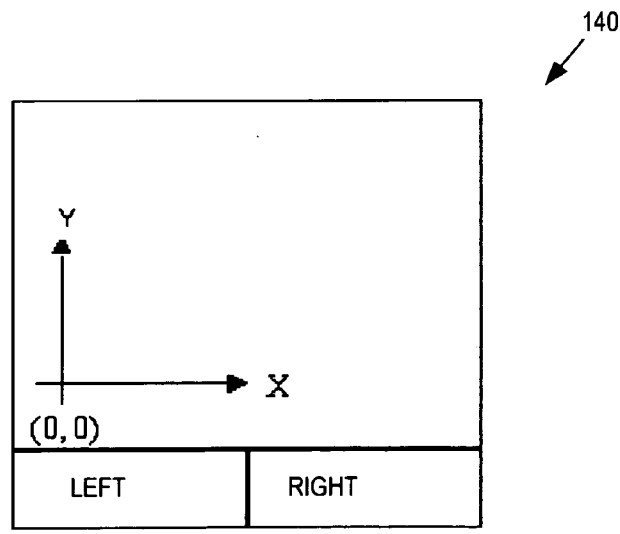
FIG. 1C illustrates a conventional touch pad interface.
Figure 2:
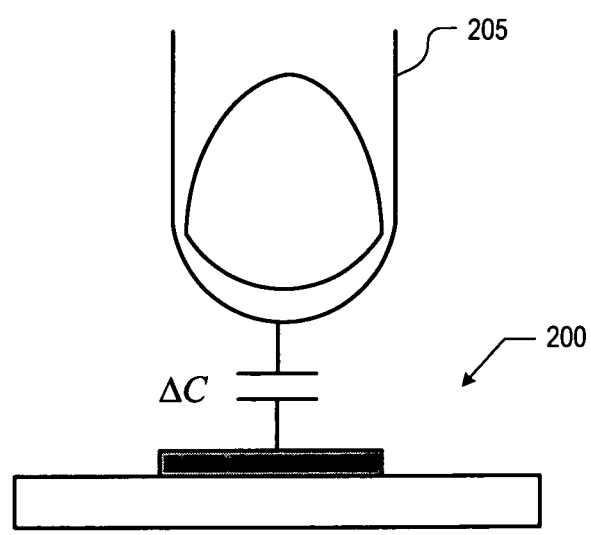
FIG. 2 illustrates a user finger interacting with a capacitance sensor, in accordance with an embodiment of the invention

FIG. 2 illustrates a user finger 205 interacting with a capacitance sensor 200, in accordance with an embodiment of the invention. When a conductive object, such as user finger 205, is moved proximate to capacitance sensor 200, a measurable capacitance change $\Delta C$ occurs at capacitance sensor 200. Of course, a user interaction with capacitance sensor 200 is not limited to a finger. Other conductive objects may be used to interact with capacitance sensor 200, including a stylus, a pen, or any other conductive object.

By monitoring capacitance sensor 200 for a capacitance change $\Delta C$ (or deviation) from a baseline capacitance value, an activation of capacitance sensor 200 can be determined (or triggered) and accepted (or registered) as a user activation in software. For purposes of this specification, accepting (or registering) an activation of capacitance sensor 200 means acknowledging in software that a user likely intended for an appropriate action or function that is associated with capacitance sensor 200 to be executed. In contrast, rejecting (or masking) an activation of capacitance sensor 200 is an acknowledgment by software that the activation of capacitance sensor 200 is ignored as an unintended or erroneous activation.

A variety of capacitance ("CAP") sense user interfaces may be implemented by grouping a plurality of capacitance sensors 200 into an array of capacitance sensors, such as a circular slider array, a linear slider array, a touch pad array, a keypad, or the like. For example, an array of capacitance sensors 200 may be used to implement user interfaces of a variety of products/devices including: door switches, white goods (e.g., kitchen appliances), laptop computers, desktop computers, personal digital assistants ("PDAs"), portable music players (e.g., MP3 players), wireless telephones, cellular telephones, radios, or the like. Capacitance sensor arrays may also be used to implement position sensors. While embodiments herein are described in relation to a keypad, it should be understood by a person of ordinary skill in the art having the benefit of the instant disclosure that embodiments of the invention may be utilized with alternative user interfaces, such as those described above.

Figure 3:
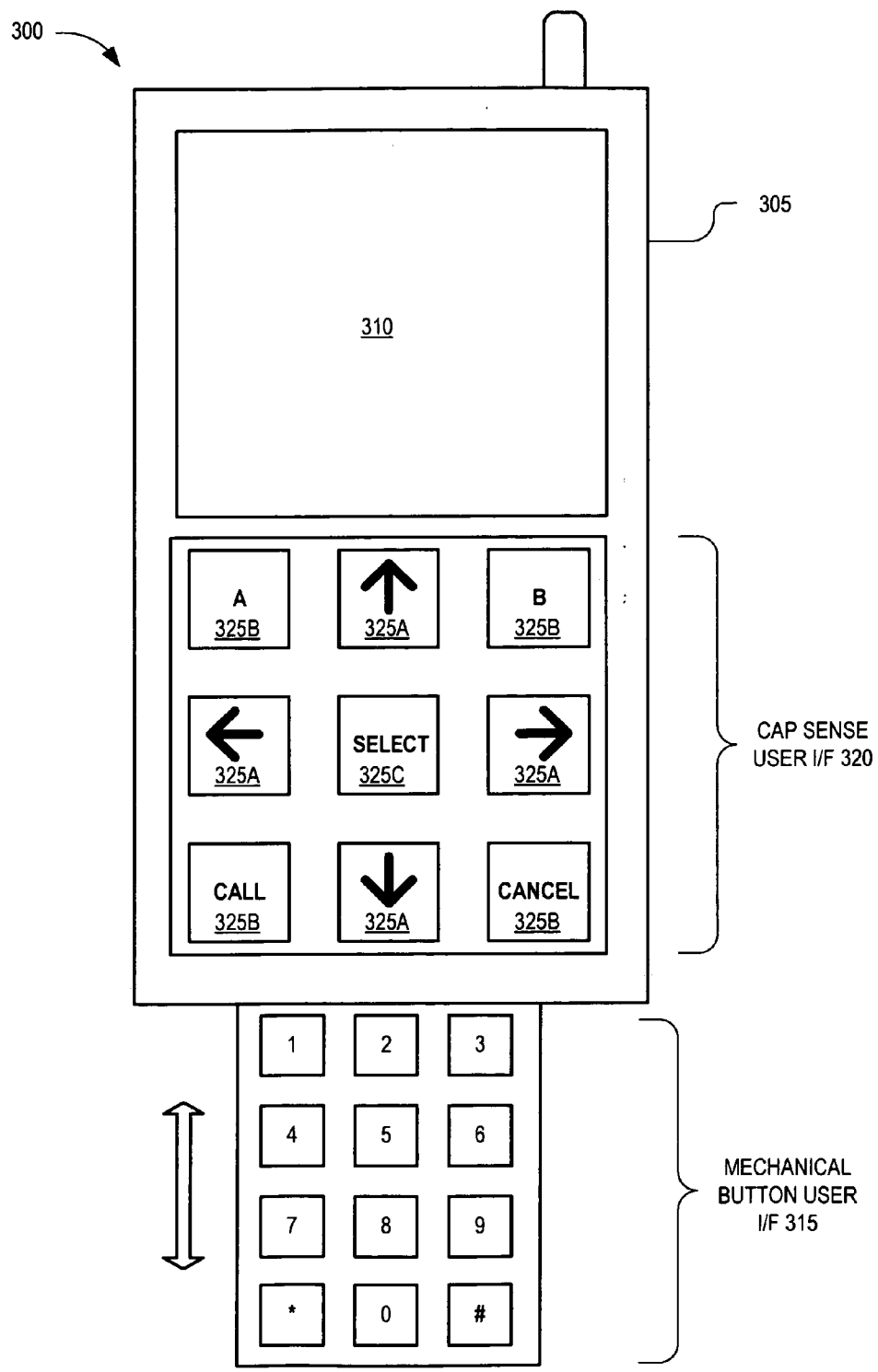
FIG. 3 illustrates a user device having both a mechanical button user interface ("I/F") and a capacitive ("CAP") sense user I/F, in accordance with an embodiment of the invention.

FIG. 3 illustrates a user device 300 including a CAP sense user interface ("I/F") that provides a more productive and pleasurable user experience over conventional CAP sense user interfaces, in accordance with an embodiment of the invention. The illustrated embodiment of user device 300 includes a device enclosure 305, screen 310, mechanical button user I/F 315, and CAP sense user I/F 320. CAP sense user I/F 320 includes an array of nine capacitance sensors 325A-325C (collectively 325) including: four capacitance sensors 325A assigned to implement pointer or arrow functions, four capacitance sensors 325B located at corners of CAP sense user I/F 320, and one capacitance sensor 325C assigned to implement select or enter functions. Although FIG. 3 illustrates an embodiment of CAP sense user I/F 320 that includes an array of nine capacitance sensors 325, it should be appreciated that other embodiments may include more or less capacitance sensors 325, may include capacitance sensors 325 that perform functions different from those described in this specification, and may include capacitance sensors 325 placed at different locations and orientations.

CAP sense user I/F 320 may not provide tactile feedback to a user who intends to activate only one of the capacitance sensors 325 because a user does not have to touch CAP sense user I/F 320 for measurable capacitance changes to occur on capacitance sensors 325. Therefore, in order to provide a pleasurable and productive user experience, one or more mechanisms may be used to determine which capacitance sensor 325 a user likely intended to activate when the user concurrently activates multiple capacitance sensors 325.

Figure 4:
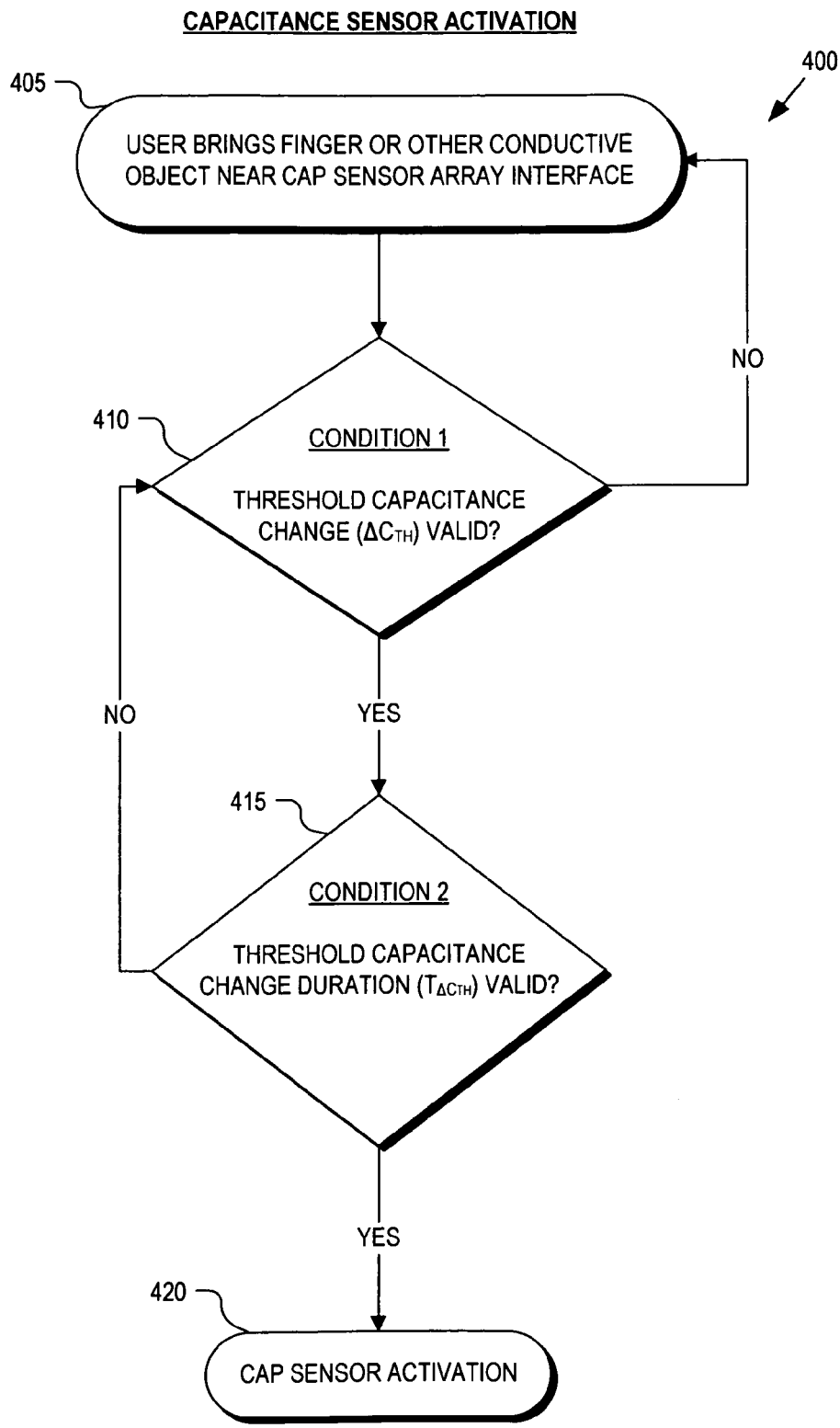
FIG. 4 is a flow chart illustrating a process to trigger an activation of a capacitance sensor, in accordance with an embodiment of the invention.

For instance, in one embodiment of the invention, one mechanism used to determine which capacitance sensor 325 a user likely intended to activate when the user concurrently activates multiple capacitance sensors 325 is to consider one or more conditions before triggering an activation of a capacitance sensor 325. FIG. 4 is a flow chart illustrating process 400 that includes one or more conditions that may be considered before triggering an activation of a capacitance sensor 325, in accordance with an embodiment of the invention. Process 400 and the processes explained below may be used in connection with CAP sense user I/F 320 or other CAP sense user interfaces and are described in terms of computer software and hardware. The process blocks described may constitute machine-executable instructions embodied within a machine (e.g., computer) readable medium, which when executed by a machine will cause the machine to perform the operations described. Additionally, the processes may be embodied within hardware, such as an application specific integrated circuit ("ASIC") or the like. The order in which some or all of the process blocks appear in each process should not be deemed limiting. Rather, it should be understood by a person of ordinary skill in the art having the benefit of the instant disclosure that some of the process blocks may be executed in a variety of orders not illustrated.

In a process block 405, a user interacts with CAP sense user I/F 320 by bringing a conductive object (e.g., user's finger) proximate to CAP sense user I/F 320. In a decision block 410, logic determines whether a threshold capacitance change condition $\Delta C_{TH}$ (or threshold deviation from a baseline capacitance value) occurred on a capacitance sensor 325. If the threshold capacitance change condition $\Delta C_{TH}$ has occurred, process 400 continues to a decision block 415, else process 400 returns to process block 405.

In decision block 415, logic determines whether a threshold capacitance change duration condition $T_{\Delta C_{TH}}$ has occurred on capacitance sensor 325. In other words, the logic determines whether the threshold capacitance change condition $\Delta C_{TH}$ has occurred for at least the amount of time set by the threshold capacitance change duration condition $T_{\Delta C_{TH}}$. If the threshold capacitance change duration condition $T_{\Delta C_{TH}}$ has occurred, process 400 continues to a process block 420. In process block 420, an activation of the capacitance sensor 325 is triggered. However, it should be appreciated that if multiple concurrent activations have occurred, then whether a particular activation is accepted or rejected may be determined as described below.

If the threshold capacitance change duration condition $T_{\Delta C_{TH}}$ has not occurred, then process 400 returns to decision block 410. By adjusting one or both of the conditions set forth in decision blocks 410 and 415, a capacitance sensor's threshold sensitivity that triggers its activation can be manipulated. Thus, a different threshold sensitivity can be assigned to different capacitance sensors 325, so that the activation of some capacitance sensors 325 may be preferred over the activation of other capacitance sensors 325.

Figure 5:
FIG. 5 is a table illustrating assignment of different sensitivities to capacitance sensors within a CAP sense user I/F to prioritize the capacitance sensors, in accordance with an embodiment of the invention.

FIG. 5 is a table illustrating assignment of different sensitivities to different capacitance sensors 325 to prioritize capacitance sensors 325 based on their assigned function or their physical location within CAP sense user I/F 320, in accordance with an embodiment of the invention. In one embodiment, capacitance sensors 325 assigned to implement pointer or arrow functions are more sensitive than capacitance sensors 325 located at the corners of CAP sense user I/F 320. In one embodiment, capacitance sensors 325 located at corners of CAP sense user I/F 320 are more sensitive than capacitance sensors 325 assigned to implement select or enter functions.

Figure 6:
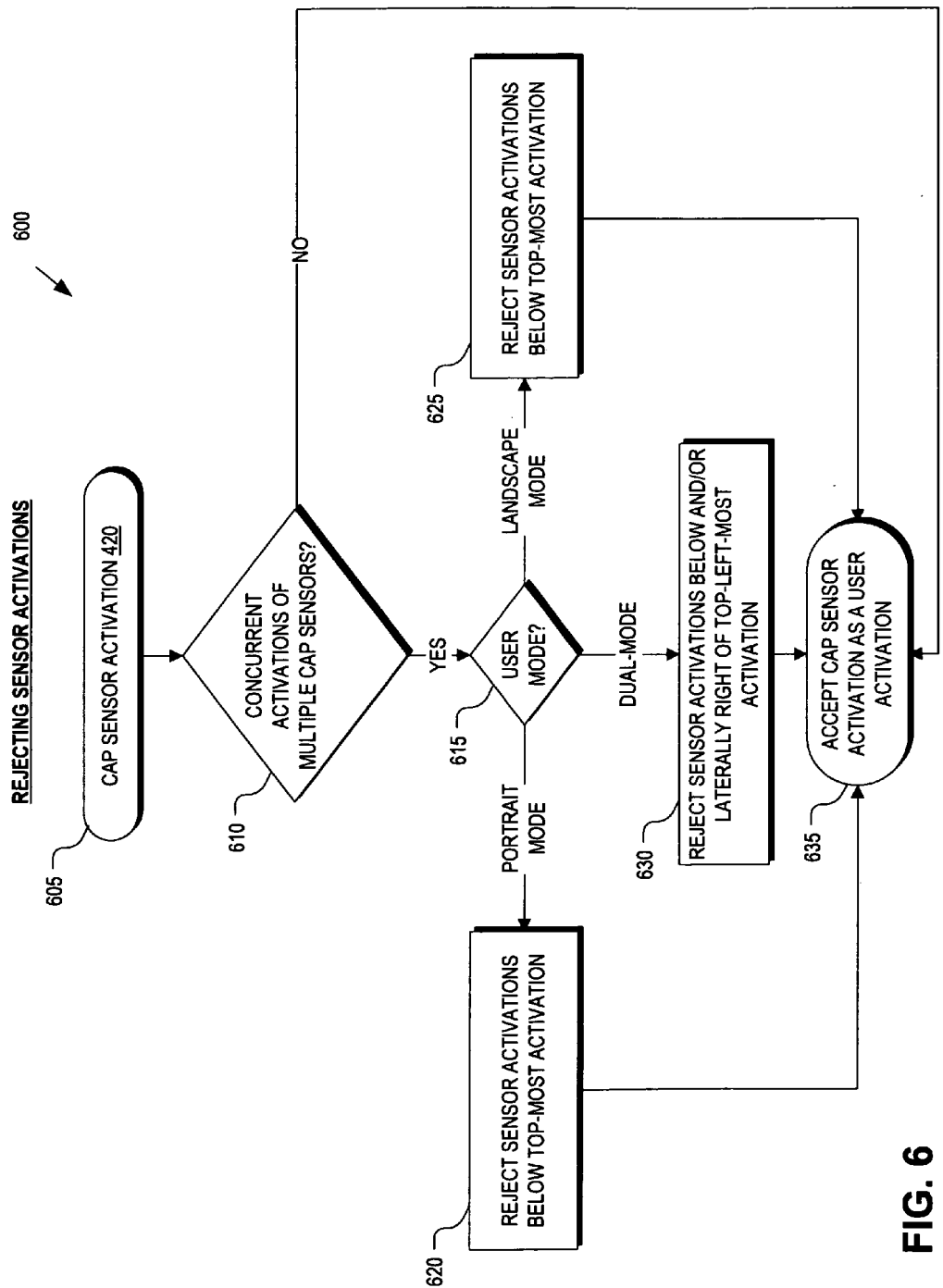
FIG. 6 is a flow chart illustrating a process for masking (or rejecting) concurrent activations of multiple capacitance sensors, in accordance with an embodiment of the invention.
Figure 7C:
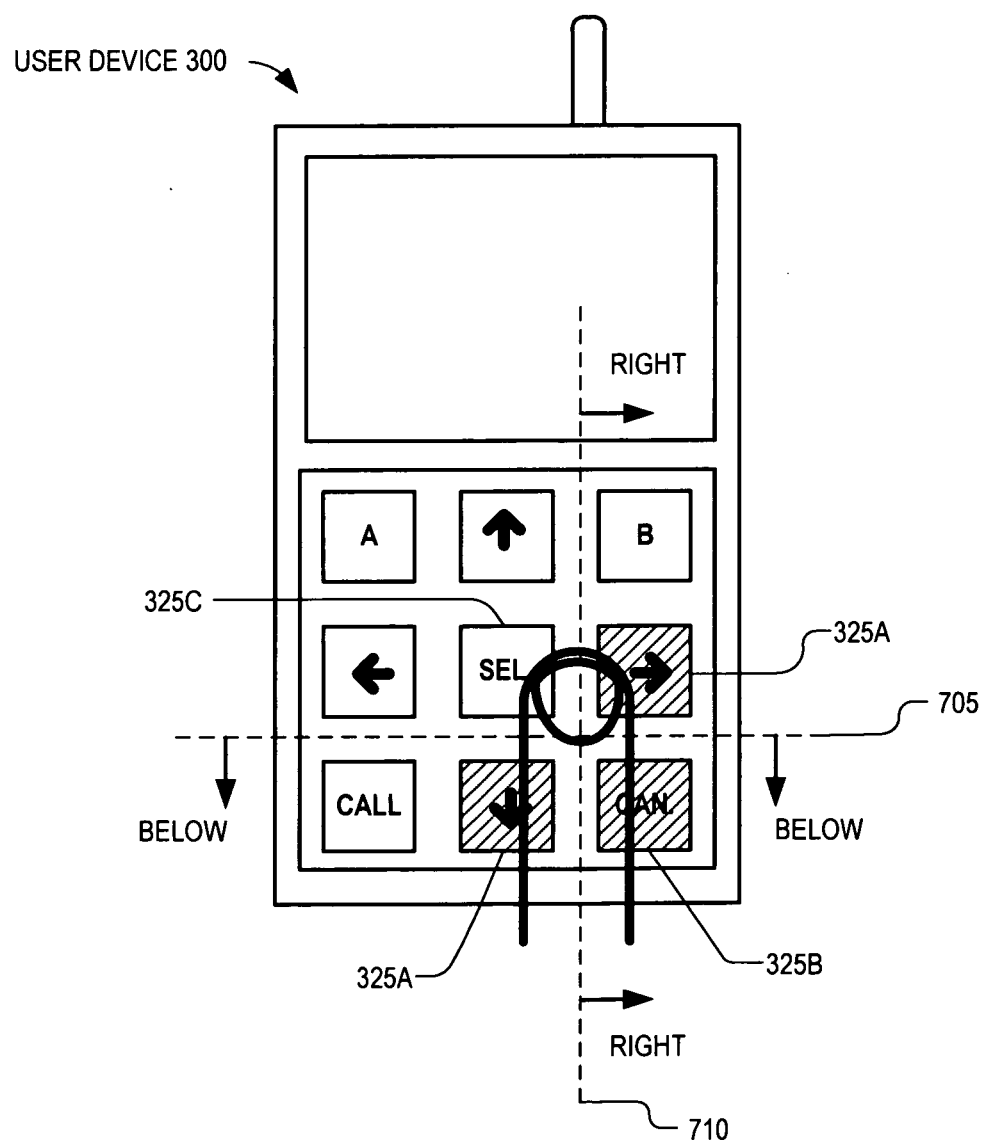
FIG. 7C is a diagram illustrating a user device configured to operate in a dual-mode irrespective of an orientation of the user device, in accordance with an embodiment of the invention.

Another mechanism to improve the use of CAP sense user I/F 320 is rejecting capacitance sensor activations when multiple concurrent activations occur, as illustrated by process 600 of flow chart FIG. 6. Process 600 will be described with reference to FIGS. 7A, 7B, and 7C. FIG. 7A illustrates user device 300 configured to operate in a portrait mode when user device 300 is operated in a portrait orientation. FIG. 7B illustrates user device 300 configured to operate in a landscape mode when user device 300 is operated in a landscape orientation. FIG. 7C illustrates user device 300 configured to operate in a dual-mode, irrespective of its physical orientation.

In a process block 605, a capacitance sensor activation 420 occurs. If a user places his/her finger proximate to more than one capacitance sensor of CAP sense user I/F 320, he/she may concurrently activate multiple capacitance sensors 325. If concurrent activations of multiple capacitance sensors 325 have occurred (decision block 610), then process 600 continues to a decision block 615. If a single capacitance sensor activation has occurred, then process 600 continues to a process block 635, in which the single capacitance sensor activation is accepted as a user activation.

In decision block 615, the user mode of user device 300 is determined. In process 600, user device 300 can be configured to operate in either a portrait mode, a landscape mode, or a dual-mode, in accordance with an embodiment of the invention. While embodiments herein are described in relation to the portrait mode, the landscape mode, or the dual-mode configuration of user device 300, it should be understood by a person of ordinary skill in the art having the benefit of the instant disclosure that embodiments of the invention may be utilized with some or all of the modes herein described, including alternative user modes referenced to alternative user configurations.

FIG. 7A is a diagram illustrating user device 300 configured to operate in the portrait mode when user device 300 is operated in a portrait orientation, in accordance with an embodiment of the invention. The illustrated embodiment of user device 300 is operated in the portrait orientation when its y-axis is vertically oriented. However, it should be appreciated that other embodiments may be operated in the portrait mode when the y-axis of user device 300 is operated in orientations different from those described in this specification. FIG. 7A further illustrates a user's finger concurrently activating multiple capacitance sensors (i.e., two capacitance sensors 325A and two capacitance sensors 325B) within CAP sense user I/F 320. Although the user's finger is proximate to capacitance sensor 325C, capacitance sensor 325C is not activated because one or both of the conditions for activation described by process 400 is not satisfied.

If user device 300 is configured to operate in the portrait mode, process 600 continues from decision block 615 to a process block 620. In process block 620, concurrent activations of capacitance sensors physically located below a top-most capacitance sensor activation are rejected. In the portrait mode, "below" is not limited to meaning "directly below" or "directly vertically below." Rather, the term "below" is a relative term that means below, along the y-axis of user device 300, as depicted by a dashed line illustrated in FIG. 7A. As illustrated in FIG. 7A, three activated capacitance sensors (i.e., two activated capacitance sensors 325A and one activated capacitance sensor 325B) physically located (along the y-axis) below top-most activated capacitance sensor 325 (capacitance sensor 325B labeled "B" on CAP sense user I/F 320) are rejected (rejected activated sensors are denoted with a shading). Process 600 then continues to process block 635. In process block 635, the top-most activated capacitance sensor 325 (capacitance sensor 325B labeled "B" on CAP sense user I/F 320) is accepted as a user activation.

FIG. 7B illustrates user device 300 configured to operate in the landscape mode when user device 300 is operated in a landscape orientation, in accordance with an embodiment of the invention. The illustrated embodiment of user device 300 is operated in the landscape orientation when its y-axis is horizontally oriented. However, it should be appreciated that other embodiments may be operated in the landscape mode when the y-axis of user device 300 is operated in orientations different from those described in this specification. FIG. 7B further illustrates a user's finger concurrently activating multiple capacitance sensors (i.e., one capacitance sensor 325A and two capacitance sensors 325B) within CAP sense user I/F 320.

If user device 300 is configured to operate in the landscape mode, process 600 continues from decision block 615 to a process block 625. In process block 625, concurrent activations of capacitance sensors physically located below a top-most capacitance sensor activation are rejected. In the landscape mode, "below" is not limited to meaning "directly below" or "directly vertically below." Rather, the term "below" is a relative term that means below, along the x-axis of user device 300, as depicted by a dashed line illustrated in FIG. 7B. As illustrated in FIG. 7B, two activated capacitance sensors (i.e., one activated capacitance sensor 325A and one activated capacitance sensor 325B) physically located (along the x-axis) below top-most activated capacitance sensor 325 (capacitance sensor 325B labeled "A" on CAP sense user I/F 320) are rejected. Process 600 then continues to process block 635. In process block 635, the top-most activated capacitance sensor 325 (sensor 325B labeled "A" on CAP sense user I/F 320) is accepted as a user activation.

FIG. 7C is a diagram illustrating user device 300 configured to operate in the dual-mode, in accordance with an embodiment of the invention. Dual-mode applies a single set of masking rules, irrespective of the physical orientation of user device 300. FIG. 7C further illustrates a user's finger concurrently activating multiple capacitance sensors (i.e., two capacitance sensors 325A, one capacitance sensor 325B, and one capacitance sensor 325C) within CAP sense user I/F 320. If user device 300 is configured to operate in the dual-mode, process 600 continues from decision block 615 to a process block 630. In process block 630, concurrent activations of capacitance sensors physically located below and/or laterally right of a top-left-most capacitance sensor activation are rejected. In the dual-mode, "below" is not limited to meaning "directly below" or "directly vertically below." Rather, the term "below" is a relative term that means below an axis 705. Further, "laterally right" is not limited to meaning "directly right" or "directly horizontally right." Rather, the phrase "laterally right" is a relative phrase that means right of an axis 710. While embodiments herein are described in relation to the axes 705 and 710 shown in FIG. 7C, it should be understood by a person of ordinary skill in the art having the benefit of the instant disclosure that embodiments of the invention may be utilized with alternative axes at alternative locations of CAP sense user I/F 320.

As illustrated in FIG. 7C, three activated capacitance sensors (i.e., two activated capacitance sensors 325A and one activated capacitance sensor 325B) physically located below and/or laterally right of top-left-most activated capacitance sensor 325 (sensor 325C labeled "SEL" on CAP sense user I/F 320) are rejected. Process 600 then continues to process block 635. In process block 635, the top-left-most activated capacitance sensor 325 (sensor 325C labeled "SEL" on CAP sense user I/F 320) is accepted as a user activation.

In an alternate embodiment of the invention, the masking rules set forth by the portrait, landscape, and dual-mode configurations are pre-empted by implementing a prioritization between the top-most activated capacitance sensors physically located laterally left or right of each other. As discussed above, capacitance sensor 325C labeled "SEL" and capacitance sensor 325A labeled "→" may be assigned different priority levels via differing sensitivities. In one embodiment, when a scenario arises that two or more of the concurrently activated capacitance sensors are the top-most activated capacitance sensors physically juxtaposed laterally to each other, the prioritization rules will preempt the masking rules. For example, referring to FIG. 7C, under the masking rules capacitance sensor 325C labeled "SEL" is registered while capacitance sensor 325A labeled "→" is masked. However, when applying the preempting priority rule described above, since capacitance sensor 325A labeled "→" is assigned a higher priority over capacitance sensor 325C labeled "SEL", capacitance sensor 325C labeled "SEL" is masked and capacitance sensor 325A labeled "→" is registered. Accordingly, in one embodiment, the masking rules illustrated in FIG. 6 are preempted by prioritizing the top-most activated capacitance sensors among the concurrently activated capacitance sensors.

Figure 8:
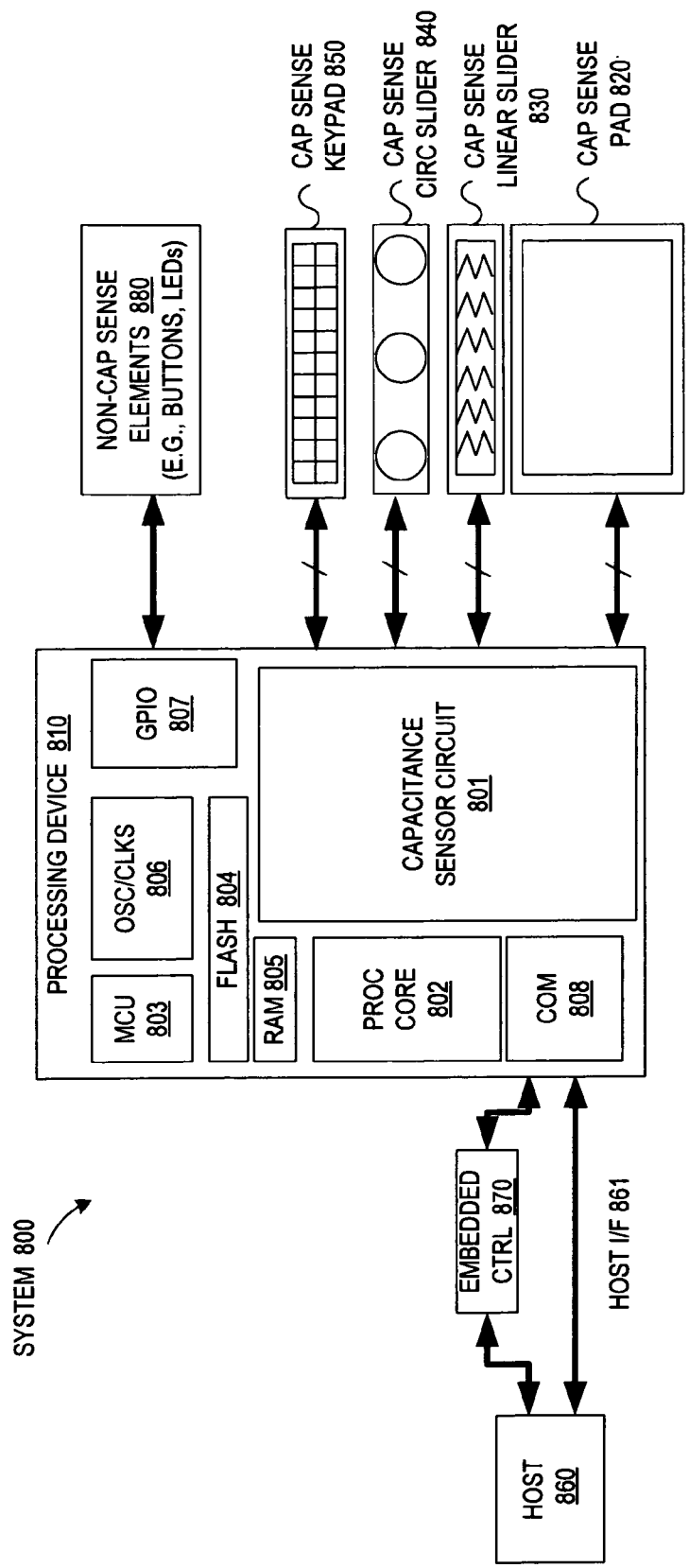
FIG. 8 is a functional block diagram illustrating a demonstrative processing system for implementing a CAP sense user I/F, in accordance with an embodiment of the invention.

FIG. 8 is a functional block diagram illustrating a demonstrative system 800 for implementing a capacitance sense user interface, in accordance with an embodiment of the invention. System 800 includes a processing device 810, a capacitive sense pad 820, a capacitive sense linear slider 830, a capacitive sense circular slider 840, a capacitive sense keypad 850, a host processor 860, an embedded controller 870, and non-capacitance sensor elements 880. Processing device 810 may include analog and/or digital general purpose input/output ("GPIO") ports 807. GPIO ports 807 may be programmable. GPIO ports 807 may be coupled to Programmable Interconnect and Logic, which acts as an interconnect between GPIO ports 807 and a digital block array of processing device 810 (not illustrated).

The digital block array may be configured to implement a variety of digital logic circuits (e.g., digital filters, digital control systems, etc.) using, in one embodiment, configurable user modules ("UMs"). The digital block array may be coupled to a system bus. Processing device 810 may also include memory, such as random access memory ("RAM") 805 and program flash ("FLASH") 804. RAM 805 may be static RAM ("SRAM"), and FLASH 804 may be a non-volatile storage, which may be used to store firmware (e.g., control algorithms executable by processing core 802 to implement operations described herein, such as the aforementioned processes). Processing device 810 may also include a memory controller unit ("MCU") 803 coupled to memory and the processing core 802.

Processing device 810 may also include an analog block array (not illustrated). The analog block array is also coupled to the system bus. The analog block array may be configured to implement a variety of analog circuits (e.g., analog-to-digital converters, analog filters, etc.) using, in one embodiment, configurable UMs. The analog block array may also be coupled to GPIO ports 807.

As illustrated, capacitance sensor circuit 801 may be integrated into processing device 810. Capacitance sensor circuit 801 may include analog input/output ("I/O") for coupling to an external component, such as capacitive sense pad 820, capacitive sense linear slider 830, capacitive sense circular slider 840, capacitive sense keypad 850, and/or other devices. Capacitance sensor circuit 801 is described in more detail below.

Processing device 810 may include internal oscillator/clocks 806 and communication ("COM") block 808. The oscillator/clocks 806 block provides clock signals to one or more of the components of processing device 810. COM block 808 may be used to communicate with an external component, such as a host processor 860, via host I/F 861. Alternatively, processing device 810 may also be coupled to embedded controller 870 to communicate with the external components, such as host processor 860. Interfacing to host processor 860 can be through various methods.

In one embodiment, interfacing with host processor 860 may be done using a standard Personal System/2 ("PS/2") interface to connect to embedded controller 870, which in turn sends data to host processor 860 via a low pin count interface. In some instances, it may be beneficial for processing device 810 to do both touch-sensor pad and keyboard control operations, thereby freeing up the embedded controller 870 for other functions. In another embodiment, interfacing may be done using a universal serial bus ("USB") interface directly coupled to host processor 860 via host I/F 861. Alternatively, processing device 810 may communicate to external components, such as host processor 860 using industry standard interfaces, such as USB, PS/2, inter-integrated circuit ("I2C") bus, or Serial Peripheral Interface ("SPI") bus. Host processor 860 and/or embedded controller 870 may be coupled to processing device 810 with a ribbon or flex cable from an assembly, which houses a sensing device and processing device 810.

In one embodiment, processing device 810 is configured to communicate with embedded controller 870 or host processor 860 to send and/or receive data. The data may be commands or signals. In one embodiment, system 800 may operate in both standard-mouse compatible and enhanced modes. The standard-mouse compatible mode utilizes the Human Interface Device ("HID") class drivers already built into the Operating System ("OS") software of host processor 860. These drivers enable processing device 810 and a sensing device to operate as a standard cursor control user interface device, such as a two-button PS/2 mouse. The enhanced mode may enable additional features such as scrolling, reporting absolute position, or disabling the sensing device (e.g., when a mouse is plugged into the notebook). Alternatively, processing device 810 may be configured to communicate with embedded controller 870 or host processor 860, using non-OS drivers, such as dedicated touch-sensor pad drivers or other drivers known by those of ordinary skill in the art.

Processing device 810 may reside on a common carrier substrate such as an integrated circuit ("IC") die substrate, a multi-chip module substrate, or the like. Alternatively, the components of processing device 810 may be one or more separate integrated circuits and/or discrete components. In one embodiment, processing device 810 may be a Programmable System on a Chip ("PSoC™") processing device, manufactured by Cypress Semiconductor Corporation, San Jose, Calif. Alternatively, processing device 810 may be one or more other processing devices known by those of ordinary skill in the art, such as a microprocessor or central processing unit, a controller, a special-purpose processor, a digital signal processor ("DSP"), a field programmable gate array ("FPGA"), an application specific integrated circuit ("ASIC"), or the like. In an alternative embodiment, for example, processing device 810 may be a network processor having multiple processors including a core unit and multiple microengines. Additionally, processing device 810 may include any combination of general-purpose processing device(s) and special-purpose processing device(s).

Capacitance sensor circuit 801 may be integrated into an IC of processing device 810, or alternatively, in a separate IC. Descriptions of capacitance sensor circuit 801 may be generated and compiled for incorporation into other integrated circuits. For example, behavioral level code describing capacitance sensor circuit 801, or portions thereof, may be generated using a hardware descriptive language, such as Very High Speed Integrated Circuits Hardware Description Language ("VHDL") or Verilog, and stored to a machine-accessible medium (e.g., compact disk-read only memory ("CD-ROM"), hard disk, floppy disk, etc.). Furthermore, the behavioral level code can be compiled into register transfer level ("RTL") code, a netlist, or even a circuit layout and stored to a machine-accessible medium. The behavioral level code, RTL code, netlist, and circuit layout all represent various levels of abstraction to describe capacitance sensor circuit 801.

In one embodiment, system 800 may be used in a notebook computer. Alternatively, system 800 may be used in other applications, such as a mobile handset, personal data assistant ("PDA"), keyboard, television, remote control, monitor, handheld multi-media device, handheld video player, handheld gaming device, or control panel.

In one embodiment, capacitance sensor circuit 801 may be a capacitive switch relaxation oscillator ("CSR"). The CSR may have an array of capacitive sensors using a current-programmable relaxation oscillator, an analog multiplexer, digital counting functions, and high-level software routines to compensate for environmental and physical capacitance sensor variations. The CSR may include physical, electrical, and/or software components. The physical component may include a physical array of capacitance sensors, typically a pattern constructed on a printed circuit board ("PCB") with an insulating cover, a flexible membrane, or a transparent overlay. The electrical component may include an oscillator or other means to convert a changed capacitance into a measured signal. The electrical component may also include a counter or timer to measure the oscillator output. The software component may include detection, compensation, and decision software algorithms to convert the count value into a capacitive sensor detection decision.

It should be noted that there are various known methods for measuring capacitance. Although the embodiments described herein are described using a relaxation oscillator, the present embodiments are not limited to using relaxation oscillators, but may include other methods, such as current versus voltage phase shift measurement, resistor-capacitor charge timing, capacitive bridge divider, charge transfer, or the like.

The current versus voltage phase shift measurement may include driving the capacitance through a fixed-value resistor to yield voltage and current waveforms that are out of phase by a predictable amount. The drive frequency can be adjusted to keep the phase measurement in a readily measured range. The resistor-capacitor charge timing may include charging the capacitor through a fixed resistor and measuring timing on the voltage ramp. Small capacitor values may require very large resistors for reasonable timing. The capacitive bridge divider may include driving the capacitor under test through a fixed reference capacitor. The reference capacitor and the capacitor under test form a voltage divider. The voltage signal is recovered with a synchronous demodulator, which may be done in processing device 810. The charge transfer may be conceptually similar to an R-C charging circuit. In this method, $C_P$ is the capacitance being sensed and $C_{SUM}$ is the summing capacitor, into which charge is transferred on successive cycles. At the start of the measurement cycle, the voltage on $C_{SUM}$ is reset. The voltage on $C_{SUM}$ increases exponentially (and only slightly) with each clock cycle. The time for this voltage to reach a specific threshold is measured with a counter.

Figure 9:
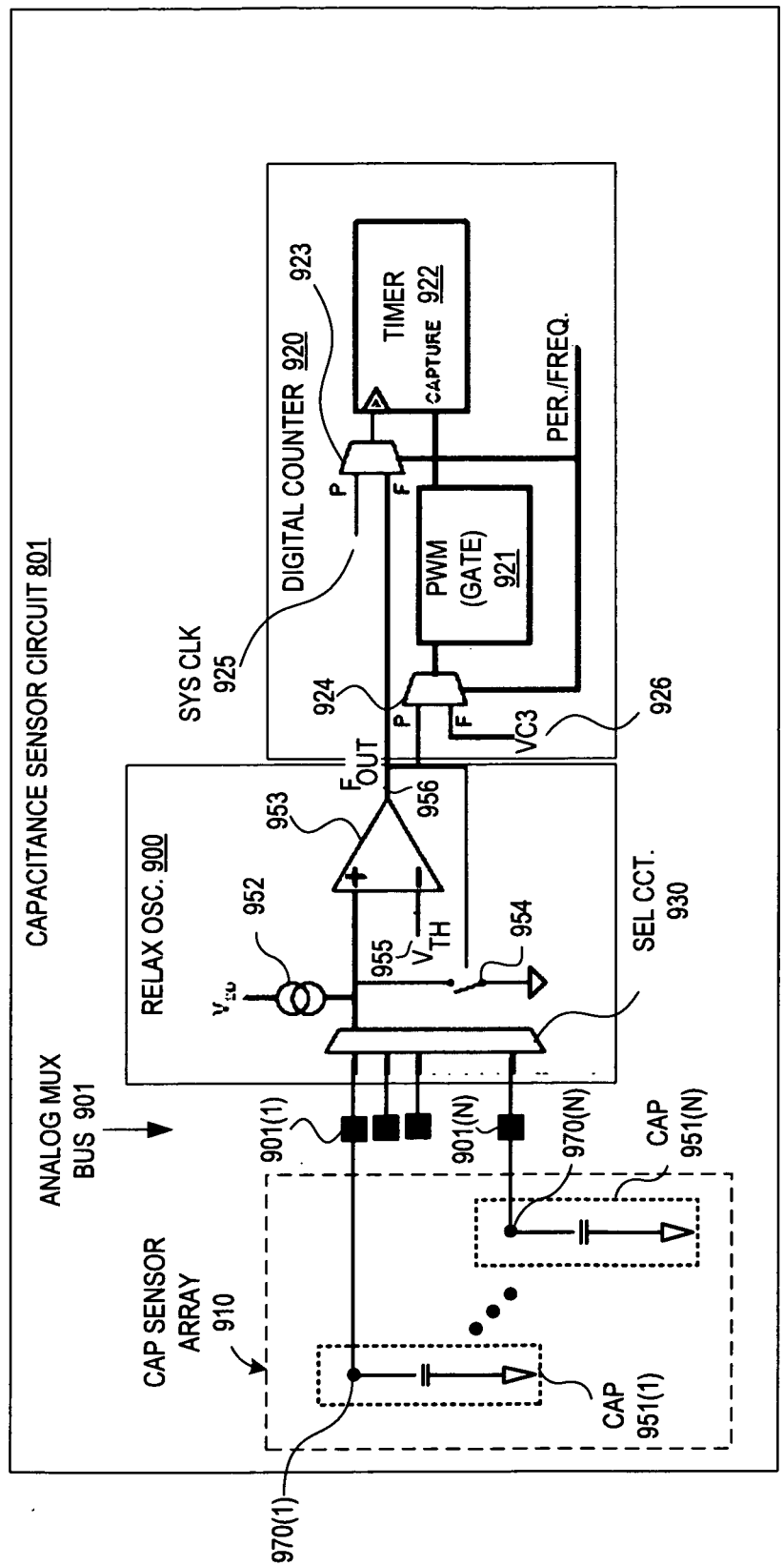
FIG. 9 is a circuit diagram illustrating a demonstrative capacitance sensor circuit, in accordance with an embodiment of the invention.

FIG. 9 illustrates one embodiment of capacitance sensor circuit 801 implemented with a relaxation oscillator circuit 900. The illustrated embodiment of capacitance sensor circuit 801 includes relaxation oscillator circuit 900, an analog multiplexer ("MUX") bus 901, a CAP sensor array 910, and a digital counter 920. CAP sensor array 910 may represent any form of capacitance sensors, such as a circular slider array, linear slider array, touch pad array, keypad array, or the like.

Relaxation oscillator 900 is formed by the capacitance to be measured on capacitance sensors 951, a charging current source 952, a comparator 953, and a reset switch 954. Capacitance sensors 951 are representative of the capacitance measured on a sensor element of a CAP sensor array 910. The relaxation oscillator is coupled to drive a charging current Ic in a single direction onto a device under test ("DUT") capacitor (e.g., any of the capacitance sensors 951). As the charging current Ic charges a capacitance sensor 951, the voltage across the capacitance sensor 951 increases with time as a function of Ic and its capacitance C. Equation (1) describes the relation between current, capacitance, voltage, and time for a charging capacitor.

$$CdV = I_c dt \quad (1)$$

The relaxation oscillator begins by charging a capacitance sensor 951, at a fixed current Ic, from a ground potential (or zero voltage) until the voltage across the capacitance sensor 951 reaches a reference voltage or threshold voltage $V_{TH}$ 955. When the voltage at node 970 reaches $V_{TH}$ 955, the relaxation oscillator allows the accumulated charge at node 970 to discharge (i.e., the relaxation oscillator allows the capacitance sensor 951 to "relax" back to the ground potential) and then the process repeats itself. In particular, the output of comparator 953 asserts a relaxation oscillator clock signal ("$F_{OUT}$") 956 (i.e., $F_{OUT}$ goes high), which enables the reset switch 954. This resets the voltage on the capacitor at node 970 to ground and the charge cycle starts again. The frequency of $F_{OUT}$ 956, $f_{RO}$, is dependent upon capacitance C of the capacitance sensor 951 and charging current Ic.

The trip time of the comparator 953 and reset switch 954 add a fixed delay. The output of the comparator 953 is synchronized with a reference system clock ("REF CLK") to guarantee that the comparator reset time is long enough to completely reset the charging voltage on capacitance sensor 951. If capacitance C of the capacitance sensor 951 changes, then $f_{RO}$ will change proportionally according to Equation (1). By comparing $f_{RO}$ of $F_{OUT}$ 956 against a frequency $f_{REF}$ of REF CLK, the change in capacitance $\Delta C$ can be measured. Accordingly, equations (2) and (3) below describe that a change in frequency between $F_{OUT}$ 956 and REF CLK is proportional to a change in capacitance $\Delta C$ of the capacitance sensor 951.

$$\Delta C \propto 1/\Delta f, \text{ where} \quad (2)$$

$$\Delta f = f_{RO} - f_{REF}. \quad (3)$$

In one embodiment, a frequency comparator may be coupled to receive relaxation oscillator clock signal $F_{OUT}$ 956 and REF CLK, compare their frequencies $f_{RO}$ and $f_{REF}$, respectively, and output a signal indicative of the difference $\Delta f$ between these frequencies. By monitoring $\Delta f$, one can determine whether the capacitance of the capacitance sensor 951 has changed. In one embodiment, the relaxation oscillator 950 may be built using a programmable timer (e.g., 555 timer) to implement the comparator 953 and reset switch 954. Alternatively, the relaxation oscillator 900 may be built using other circuits.

Sensor array 910 includes a plurality of capacitance sensors 951(1)-951(N), where N is a positive integer value that represents the number of capacitive sensors within any array of capacitance sensors of capacitive sense pad 820, capacitive sense linear slider 830, capacitive sense circular slider 840, or capacitive sense keypad 850. Relaxation oscillator 900 further includes a selection circuit 930. Selection circuit 930 is coupled to the plurality of capacitance sensors 951(1)-951(N), the reset switch 954, the current source 952, and the comparator 953. Selection circuit 930 may be used to allow the relaxation oscillator 900 to measure capacitance on multiple sensor elements (e.g., rows or columns). Selection circuit 930 may be configured to sequentially select a capacitance sensor from the plurality of capacitance sensors 951(1)-951(N) to provide charge current and to measure the capacitance of a capacitance sensor 951.

In one embodiment, selection circuit 930 is a multiplexer array of relaxation oscillator 900. Alternatively, selection circuit 930 may be other circuitry outside relaxation oscillator 900, or even outside capacitance sensor circuit 801, used to select the capacitance sensor 951 to be measured. Capacitance sensor circuit 801 may include one relaxation oscillator and digital counter for the plurality of capacitance sensors 951(1)-951(N) of CAP sensor array 910. Alternatively, capacitance sensor circuit 801 may include multiple relaxation oscillators and digital counters to measure capacitance of the plurality of capacitance sensors 951(1)-951(N) of CAP sensor array 910. The multiplexer array of relaxation oscillator 900 may also be used to ground the sensor elements that are not being measured. This may be done in conjunction with a dedicated pin in GPIO port 807.

In another embodiment, capacitance sensor circuit 801 may be configured to simultaneously scan the sensor elements, as opposed to being configured to sequentially scan the sensor elements as described above. For example, the sensing device may include a sensor array having a plurality of rows and columns. The rows may be scanned simultaneously and the columns may be scanned simultaneously.

In one embodiment, the voltages on all of the rows of CAP sensor array 910 are simultaneously moved, while the voltages of the columns are held at a constant voltage, with the complete set of sampled points simultaneously giving a profile of the conductive object in a first dimension. Next, the voltages on all of the rows are held at a constant voltage, while the voltages on all the rows are simultaneously moved, to obtain a complete set of sampled points simultaneously giving a profile of the conductive object in a second dimension.

In another embodiment, the voltages on all of the rows of CAP sensor array 910 are simultaneously moved in a positive direction, while the voltages of the columns are moved in a negative direction. Next, the voltages on all of the rows of CAP sensor array 910 are simultaneously moved in a negative direction, while the voltages of the columns are moved in a positive direction. This technique doubles the effect of any transcapacitance between the two dimensions, or conversely, halves the effect of any parasitic capacitance to the ground. In both methods, the capacitive information from the sensing process provides a profile of the presence of the conductive object to the sensing device in each dimension. Alternatively, other methods for scanning known by those of ordinary skill in the art may be used to scan the sensing device.

In one embodiment, digital counter 920 is coupled to the output of relaxation oscillator 900 (i.e., $F_{OUT}$ 956). Digital counter 920 is configured to count at least one of a frequency or a period of $F_{OUT}$ 956. When a finger or conductive object is placed proximate to a capacitance sensor 951, the capacitance increases so the relaxation oscillator output signal $F_{OUT}$ 956 decreases. There are at least two methods for counting $F_{OUT}$ 956: frequency measurement and period measurement. In one embodiment, digital counter 920 may include two multiplexers 923 and 924. Multiplexers 923 and 924 are configured to select the inputs for a pulse width modulator ("PWM") 921 and a timer 922 for the frequency and period measurement methods. Alternatively, other selection circuits may be used to select the inputs for PWM 921 and timer 922. In another embodiment, multiplexers 923 and 924 are not included in the digital counter (e.g., digital counter 920 may be configured in one, or the other, measurement method).

In the frequency measurement method, the relaxation oscillator output signal $F_{OUT}$ 956 is counted for a fixed period of time (e.g., gate time). Timer 922 is read to obtain the number of counts during the gate time. This method works well at low frequencies where the oscillator reset time is small compared to the oscillator period. In one embodiment, PWM 921 is clocked for a fixed period by a derivative of the system clock 925 (e.g., VC3 926, which is a divider from system clock 925). The output of PWM 921 enables timer 922 (e.g., 16-bit timer), the relaxation oscillator output signal $F_{OUT}$ 956 clocks timer 922, and timer 922 is reset at the start of the sequence. The count value is read out at the end of the gate period.

In the period measurement method, relaxation oscillator output signal $F_{OUT}$ 956 drives the clock input of PWM 921. The output of PWM 921 gates (enables) timer 922 (e.g., 16-bit timer), which is clocked by system clock 925 (e.g., 24 MHz). In order to improve sensitivity and resolution, multiple periods of the oscillator are counted with PWM 921. When the output of PWM 921 is asserted (e.g., goes high), the count starts by releasing a capture control signal. When the terminal count of the PWM 921 is reached, the capture control signal is asserted (e.g., goes high), stopping the count and setting a PWM interrupt. The timer 922 value is read during this interrupt. Relaxation oscillator 900 is indexed to the next capacitive sensor (e.g., capacitor 951(2)) to be measured and the count sequence is started again.

The timer 922 count time and the detection time required for capacitance sensor circuit 801 are determined by sensitivity requirements. Small changes in capacitance on capacitance sensor 951 result in small changes in frequency. In order to find these small changes, it may be necessary to count for a considerable time.

At startup (or boot) the capacitance sensors 951(1)-(N) are scanned and the count values for each capacitance sensor are stored as a baseline array (Cp). The presence of a finger proximate to a capacitance sensor 951 is determined by the difference in counts between the count value stored in the baseline array (Cp) and the count value acquired during the capacitive sensor's activation, referred to here as Δn. The sensitivity of a single capacitive sensors is approximately:

$$\frac{\Delta n}{n} = \frac{Cf}{Cp} \quad (4)$$

The value of Δn should be large enough for reasonable resolution and clear indication of a capacitive sensor activation.

Using the multiplexer array 930, multiple CAP sensor elements may be sequentially scanned by providing current to and measuring the capacitance from the CAP sense elements, as previously described. In other words, while one CAP sensor element is being measured, the remaining sensor elements are grounded using GPIO port 807. This drive and multiplex arrangement bypasses the existing GPIO to connect the selected pin to an internal analog MUX bus. The capacitor charge current (e.g., current provided by current source 952) and reset switch 953 are connected to the analog MUX bus. This may limit the pin-count requirement to simply the number of capacitive sensors 951(1)-951(N) to be addressed. In one exemplary embodiment, no external resistors or capacitors are required inside or outside the processing device 910 to enable operation.

The capacitor charging current for the relaxation oscillator 900 is generated in a register programmable current output digital-to-analog converter ("IDAC"). Accordingly, the current source 952 is an IDAC. The output current of current source 952 may be set by an 8-bit value provided by processing device 810, such as from processing core 802. The 8-bit value may be stored in a register or in memory.

Estimating and measuring PCB capacitances may be difficult because the oscillator-reset time may add to the oscillator period (especially at higher frequencies) and the magnitude of the IDAC output current may vary with operating frequency. Accordingly, the optimum oscillation frequency and operating current for a particular switch array may be determined to some degree by experimentation.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art should recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method, comprising:
sensing concurrent activations of multiple capacitance sensors within an array of capacitance sensors, wherein each of the multiple capacitance sensors within the array of capacitance sensors has a different threshold sensitivity based on its position and priority that triggers an activation of each of the multiple capacitance sensors, wherein the priority is determined by user interface requirements for the multiple capacitance sensors;
comparing the priorities of the capacitance sensors of the multiple capacitance sensors that are associated with the concurrent activations;
accepting one of the concurrent activations of the capacitance sensors as a user activation based on the comparing; and
rejecting remaining ones of the concurrent activations of the capacitance sensors based on their physical location within the array of capacitance sensors relative to the one of the concurrent activations of the capacitance sensors accepted as the user activation.

2. The method of claim 1, wherein the array of capacitance sensors comprises a user interface of a device and wherein rejecting the remaining ones of the concurrent activations of the capacitance sensors based on their physical location comprises rejecting the remaining ones of the concurrent activations of the capacitance sensors that are physically located below the accepted one of the concurrent activations in the user interface.

3. The method of claim 2, wherein rejecting the remaining ones of the concurrent activations of the capacitance sensors based on their physical location further comprises rejecting the remaining ones of the concurrent activations of the capacitance sensors that are physically located laterally right of the accepted one of the concurrent activations in the user interface.

4. The method of claim 2, further comprising:
operating the device in a portrait mode, wherein rejecting the remaining ones of the concurrent activations of the capacitance sensors based on their physical location comprises rejecting the remaining ones of the concurrent activations of the capacitance sensors that are physically located below the accepted one of the concurrent activations in the user interface relative to a portrait orientation of the user interface when the device is operating in the portrait mode; and operating the device in a landscape mode, wherein rejecting the remaining ones of the concurrent activations of the capacitance sensors based on their physical location comprises rejecting the remaining ones of the concurrent activations of the capacitance sensors that are physically located below the accepted one of the concurrent activations in the user interface relative to a landscape orientation of the user interface when the device is operating in the landscape mode.

5. The method of claim 1, wherein the different threshold sensitivity comprises at least one of a different threshold capacitance change that does not trigger the activation, or a different threshold capacitance change that does trigger the activation.

6. The method of claim 1 wherein the physical location of the remaining ones of the concurrent activations is assigned a lower priority than the accepted one of the concurrent activations.

7. The method of claim 1, wherein the array of capacitance sensors comprises a user interface of a device, the user interface including a first capacitance sensor having a first threshold sensitivity assigned to implement a pointer or arrow function, second capacitance sensor physically located at corners of the array of capacitance sensors having a second threshold sensitivity, and a third capacitance sensor having a third threshold sensitivity assigned to implement a select or enter function, wherein the first threshold sensitivity is more sensitive to a user interaction than the second threshold sensitivity and the second threshold sensitivity is more sensitive to the user interaction than the third threshold sensitivity.

8. A non-transitory machine-readable medium having instructions recorded on the medium that provides instructions that, if executed by a machine, will cause the machine to perform operations comprising:

sensing concurrent activations of multiple capacitance sensors within an array of capacitance sensors, wherein each of the multiple capacitance sensors within the array of capacitance sensors has a different threshold sensitivity based on its position and priority that triggers an activation of each of the multiple capacitance sensors, wherein the priority level is determined by user interface requirements for the multiple capacitance sensors;

comparing the priorities of the capacitance sensors of the multiple capacitance sensors that are associated with the concurrent activations;

accepting one of the concurrent activations of the capacitance sensors as a user activation based on the comparing; and rejecting remaining ones of the concurrent activations of the capacitance sensors based on their physical location within the array of capacitance sensors relative to the one of the concurrent activations of the capacitance sensors accepted as the user activation.

9. The non-transitory machine-readable recording medium having instructions recorded on the medium of claim 8, wherein the array of capacitance sensors comprises a user interface of a device and wherein rejecting the remaining ones of the concurrent activations of the capacitance sensors based on their physical location comprises rejecting the remaining ones of the concurrent activations of the capacitance sensors that are physically located below the accepted one of the concurrent activations in the user interface.

10. The non-transitory machine-readable recording medium having instructions recorded on the medium of claim 9, wherein rejecting the remaining ones of the concurrent activations of the capacitance sensors based on their physical location further comprises rejecting the remaining ones of the concurrent activations of the capacitance sensors that are physically located laterally right of the accepted one of the concurrent activations in the user interface.

11. The non-transitory machine-readable recording medium having instructions recorded on the medium of claim 8, wherein at least two capacitance sensors within the array of capacitance sensors are assigned different priority levels, the non-transitory machine readable medium further providing instructions that, if executed by the machine, will cause the machine to perform further operations, comprising:

accepting higher priority activations between two of the concurrent activations having different priority levels that are physically located lateral to each other; and rejecting lower priority activations between two of the concurrent activations having different priority levels that are physically located lateral to each other.

12. The non-transitory machine-readable recording medium having instructions recorded on the medium of claim 8, wherein at least two capacitance sensors within the array of capacitance sensors each have a different threshold sensitivity that triggers an activation of each of the at least two capacitance sensors, and wherein the different threshold sensitivity comprises at least one of a different threshold capacitance change that does not trigger the activation, or a different threshold capacitance change that does trigger the activation.

13. The non-transitory machine-readable recording medium having instructions recorded on the medium of claim 8, wherein at least two capacitance sensors within the array of capacitance sensors each have a different threshold sensitivity that triggers an activation of each of the at least two capacitance sensors, and wherein the different threshold sensitivity comprises a different threshold capacitance change duration that must occur prior to triggering the activation.

14. An apparatus, comprising:

a processing device;

a user interface including an array of capacitance sensors coupled to the processing device; and a memory unit coupled to the processing device, the memory unit having stored therein instructions that, if executed by the processing device, will cause the processing device to perform operations comprising:

sensing concurrent activations of multiple capacitance sensors within the array of capacitance sensors, wherein each of the multiple capacitance sensors within the array of capacitance sensors has a different threshold sensitivity based on its position and priority that triggers an activation of each of the multiple capacitance sensors, wherein the priority level is determined by user interface requirements for the multiple capacitance sensors;

comparing the priorities of the capacitance sensors of the multiple capacitance sensors that are associated with the concurrent activations;

accepting one of the concurrent activations of the capacitance sensors as a user activation based on the comparing; and rejecting remaining ones of the concurrent activations of the capacitance sensors based on their physical location within the array of capacitance sensors relative to the one of the concurrent activations of the capacitance sensors accepted as the user activation.

15. The apparatus of claim 14, wherein rejecting the remaining ones of the concurrent activations of the capacitance sensors based on their physical location comprises rejecting the remaining ones of the concurrent activations of the capacitance sensors that are physically located below or laterally right of the accepted one of the concurrent activations in the user interface.

16. The apparatus of claim 14, wherein at least two capacitance sensors within the array of capacitance sensors have a different threshold sensitivity that triggers an activation of each of the at least two capacitance sensors and wherein the different threshold sensitivity comprises at least one of a different threshold capacitance change or a different threshold capacitance change duration that occur prior to triggering the activation.

17. The apparatus of claim 14, wherein the processing device comprises:
 a capacitance sensor circuit coupled to measure values indicative of a capacitance of each of the capacitance sensors within the array of capacitance sensors; and
 an analog multiplexer bus to selectively couple the capacitive sensors within the array of capacitive sensors to the capacitance sensor circuit.

18. The apparatus of claim 14, wherein the apparatus comprises a cellular phone.

19. The non-transitory machine-readable recording medium having instructions recorded on the medium of claim 8 wherein the physical location of the remaining ones of the concurrent activations is assigned a lower priority than the accepted one of the concurrent activations.

20. The apparatus of claim 14 wherein the physical location of the remaining ones of the concurrent activations is assigned a lower priority than the accepted one of the concurrent activations.

* * * * *